United States Patent [19]

Mahmoud et al.

[11] Patent Number: 5,104,676

[45] Date of Patent: Apr. 14, 1992

[54] WEIGHT CONTROL PRODUCT

[75] Inventors: Mohamed I. Mahmoud; Lisa D. Craig, both of Columbus; Keith A. Garleb, Powell; Robert L. Joseph, Columbus, all of Ohio

[73] Assignee: Abbott Laboratories, Abbott Park, Ill.

[21] Appl. No.: 722,436

[22] Filed: Jun. 27, 1991

[51] Int. Cl.$^5$ .................................................. A23L 2/38
[52] U.S. Cl. ........................................ 426/590; 426/34; 426/482; 426/573; 426/804; 424/439; 514/53; 514/951; 514/965
[58] Field of Search ................... 426/804, 93, 482, 34, 426/580, 590

[56] References Cited

U.S. PATENT DOCUMENTS

| | | | |
|---|---|---|---|
| 4,089,981 | 5/1978 | Richardson | 426/577 |
| 4,143,163 | 3/1979 | Hutchison | 426/804 |
| 4,156,021 | 5/1979 | Richardson | 426/577 |
| 4,348,379 | 9/1982 | Kowalsky | 426/804 |
| 4,401,682 | 8/1983 | Battista | 426/804 |
| 4,528,205 | 7/1985 | Turrisi | 426/804 |
| 4,619,831 | 10/1986 | Sharma | 426/804 |
| 4,680,189 | 7/1987 | Schumacher | 426/804 |
| 4,698,232 | 10/1987 | Sheu | 426/804 |
| 4,710,391 | 12/1987 | Schumacher | 426/804 |
| 4,747,881 | 5/1988 | Shaw | 426/577 |
| 4,766,004 | 8/1988 | Moskowitz | 426/613 |
| 4,774,098 | 9/1988 | Gould | 426/573 |
| 4,774,099 | 9/1988 | Feeney | 426/804 |
| 4,784,861 | 11/1988 | Gori | 426/804 |
| 4,790,991 | 12/1988 | Shaw | 426/74 |
| 4,806,475 | 2/1989 | Gould | 435/165 |
| 4,818,539 | 4/1989 | Shaw | 426/74 |
| 4,834,990 | 5/1989 | Amer | 426/804 |
| 4,851,392 | 7/1989 | Shaw | 426/658 |
| 4,877,627 | 10/1989 | Leitz | 426/804 |
| 4,915,960 | 4/1990 | Holmgren | 426/804 |
| 4,923,981 | 5/1990 | Weibel | 426/602 |
| 4,927,649 | 5/1990 | Antenucci | 426/804 |
| 4,959,227 | 9/1990 | Amer | 426/35 |
| 4,971,810 | 11/1990 | Hoyda | 426/583 |
| 4,976,982 | 12/1990 | Gillmore | 426/804 |
| 4,983,405 | 1/1991 | Cherukuri | 426/804 |
| 4,994,115 | 2/1991 | Giesfeldt | 426/482 |
| 4,996,063 | 2/1991 | Inglett | 426/804 |
| 5,024,996 | 6/1991 | Ringe | 426/804 |

FOREIGN PATENT DOCUMENTS

| | | | |
|---|---|---|---|
| 0317079 | 10/1988 | European Pat. Off. | 426/804 |
| 2729370 | 1/1978 | Fed. Rep. of Germany | 426/804 |

OTHER PUBLICATIONS

*Mayo Clinic Diet Manual*, Sixth Edition, p. 114, published by B. C. Decker Inc., 1988.
"Fermentability of various fiber sources by human fecal bacteria in vitro[1-3]", American Journal of Clinical Nutrition, 1991: 53: 1418-24.
"Applications of Soluble Dietary Fiber", Food Technology, Jan. 1987, pp. 74-75.
AACC Method 32-07, pp. 1-9.
Label from OptiTrim TM Supplement, ©1990.
Label from DynaTrim TM.
Label from Ultra Slim-FAST TM.

*Primary Examiner*—Carolyn Paden
*Attorney, Agent, or Firm*—Lonnie R. Drayer; Donald O. Nickey

[57] ABSTRACT

A weight control product is preferably in the form of agglomerated particles and is reconstitutable in water. The product contains low lactose milk and a dietary fiber system which is a particular blend of soluble, insoluble, fermentable and non-fermentable fibers. The components of the dietary fiber system are oat hull fiber, gum arabic and sodium carboxymethylcellulose. About 27% of the calories provided by the product are contributed by protein, about 50% of the calories are contributed by carbohydrates, and about 23% are contributed by fats.

20 Claims, No Drawings

WEIGHT CONTROL PRODUCT

FIELD OF THE INVENTION

The invention relates generally to a weight control product and more specifically to a weight control product which is formulated to serve as a nutritionally complete meal replacement.

BACKGROUND OF THE INVENTION

The weight control product of the present invention is designed to promote weight loss as a component of a supervised moderate weight control program for individuals who are moderately overweight and desire to lose forty pounds or less. Participants in a moderate weight loss program may use this new weight control product as a daily replacement for two meals, or two meals and up to two snacks, depending upon the calorie recommendations for a particular participant. Furthermore, the new weight control product is designed to be incorporated into a multidisciplinary nutritional program having an educational component that uses the exchange system of the American Dietetic and American Diabetes Associations to teach nutritional and meal planning.

One example of a weight control product is taught in U.S. Pat. No. 4,959,227, wherein the product has a reduced lactose content and contains dietary fiber. U.S. Pat. No. 4,784,861 teaches a "weight-control powder" which is added to food before eating and contains dietary fiber. Commercially available weight control products include: Ultra Slim·Fast ® which is distributed by Slim·Fast Foods, a Division of Thompson Medical Co., Inc., New York, N.Y.; DynaTrim ® which is marketed by the Lederle Laboratories Division of American Cyanamid Company, Pearl River, N.Y.; and OptiTrim ® which is available from the Clinical Products Division of Sandoz Nutrition Corp., Minneapolis, Minn.; all of which are available in powdered form.

Almost all prior art weight control beverage products which are marketed in a powder form require the use of low-fat liquid milk for reconstitution. Some of the prior art weight control products are deficient in certain nutrients, for example ultratrace minerals, and in dietary fiber. There are some prior art weight control products which are reconstituted with water; however most of those products are used in very-low-calorie diets supervised by physicians. They do have some of the nutritional advantages of the weight control product of the present invention. Most of the prior art over-the-counter weight control products, but not those for very-low-calorie diets, rely on fat from milk (butterfat) as their fat source. The fat source of the weight control product of the present invention is high-oleic safflower oil. The fatty acid profile of high-oleic safflower oil permits the weight control product of the present invention to meet the recommendations of the American Heart Association for a diet wherein less than 10% of total calories are from saturated fat and more than 10% are from polyunsaturated fat. The fatty acid profile of butterfat is high in saturated fat. The required use of liquid milk for reconstitution makes some of the prior art products inconvenient if liquid milk is not readily available at the user's location (for example, while traveling or at a job site).

The weight control product of the present invention offers greater convenience to the user while providing a complete and balanced meal replacement. Due to the nutrient composition and sources of the new weight control product it requires only water for reconstitution; no milk is needed to contribute protein or additional nutrients. The new weight control product is a very low lactose formulation (about 3.5 g per serving), which permits its use by most lactose-intolerant individuals.

The agglomerated particles of the new product in a powdered form are easily stirring with a spoon.

The new weight control product contains a new fiber system which does not adversely affect flavor and mouthfeel when present in a greater concentration of total dietary fiber tan is found in prior art weight control products.

DETAILED DESCRIPTION OF THE INVENTION

A most preferred embodiment of the weight product of the invention comprises a spray dried base powder which is dry blended with other ingredients to form the final product. The final product is then agglomerated and packaged in nitrogen-flushed individual serving pouches, or alternatively in a container holding powder for several servings. In an alternative embodiment a weight control product according to the invention comprises a liquid product which is packaged in a suitable container and is ready for consumption. In yet another alternative embodiment a weight control product according to the invention comprises a concentrated liquid packaged in a suitable container, with the concentrated liquid needing to be diluted by a suitable amount of water prior to consumption.

The ingredients for making a two thousand pound batch of a chocolate flavored weight control product according to a most preferred embodiment of the invention are listed in Table I, and the ingredients for making a two thousand pound batch of a vanilla flavored weight control product according to a most preferred embodiment of the invention are listed in Table II.

TABLE I

| INGREDIENTS FOR 2,000 POUND BATCH OF CHOCOLATE FLAVORED PRODUCT | |
|---|---|
| INGREDIENT | QUANTITY |
| Base Powder (Spray Dried, 3% Moisture) | 999.20 lb |
| High Oleic safflower Oil | 167.305 lb |
| Soy Lecithin | 1.707 lb |
| Monoglycerides | 1.707 lb |
| Vitamin D3 | 1.028 g |
| Vitamin K | 0.258 g |
| Non-Fat Dry Milk | 774.204 lb |
| Minerals | 57.101 lb |
| Magnesium Chloride | 19.693 lb |
| Sodium Chloride | 7.623 lb. |
| Sodium Citrate | 14.769 lb |
| Potassium Citrate | 12.237 lb |
| Dipotassium Phosphate | 2.779 lb |
| Potassium Iodide | 0.8258 g |
| Premix containing trace minerals and ultratrace minerals | 1382.451 g |
| Zinc Sulfate | 282.8495 g |
| Ferrous Sulfate | 272.3429 g |
| Manganese Sulfate | 74.8182 g |
| Copper Sulfate | 40.3676 g |
| Sodium Molybdate | 2.0391 g |
| Chromium Chloride | 1.9841 g |
| Sodium selenite | 0.7722 g |
| Sucrose-diluent | 621.8265 g |
| Citric Acid | 85.3249 g |
| Vitamin Premix | 2553.77 g |
| Ascorbic acid | 1117.27 g |
| dl Alpha Tocopheryl Acetate | 191.53 g |
| Niacinamide | 105.34 g |

TABLE I-continued
INGREDIENTS FOR 2,000 POUND BATCH OF CHOCOLATE FLAVORED PRODUCT

| INGREDIENT | QUANTITY |
|---|---|
| d-Calcium Pantothenate | 60.65 g |
| Vitamin A Palmitate | 18.45 g |
| Pyridoxine Hydrochloride | 12.77 g |
| Thiamine Mononitrate | 9.60 g |
| Riboflavin | 9.58 g |
| Folic Acid | 3.192 g |
| Biotin | 2.043 g |
| Phylloquinone | 0.112 g |
| Vitamin D3 | 0.0359 g |
| Cyanocobalamin | 0.0319 g |
| *Flavoring Ingredients* | |
| Natural and Artificial Chocolate Flavor | 10.554 lb |
| Ethyl Vanillin | 254.92 g |
| Artificial Vanilla Flavor | 166.02 g |
| Aspartame | 638.67 g |
| Sucrose | 450.34 lb |
| Total Milk Protein Isolate | 208.28 lb |
| Fiber System | 211.08 lb |
| Oat hull fiber | 105.54 lb |
| Gum Arabic | 84.44 lb |
| Sodium carboxymethylcellulose | 21.10 lb |
| Dutch Process Cocoa | 112.58 lb |
| *Processing Aids* | |
| Hydrogen Peroxide | |
| Enzyme Lactase | |
| 45% Potassium Hydroxide | |
| Citric Acid | |

TABLE II
INGREDIENTS FOR 2,000 POUND BATCH OF VANILLA FLAVORED PRODUCT

| INGREDIENT | QUANTITY |
|---|---|
| Base Powder (Spray Dried, 3% Moisture) | 1062.00 lb |
| High Oleic Safflower Oil | 177.820 lb |
| Soy Lecithin | 1.815 lb |
| Monoglycerides | 1.815 lb |
| Vitamin D3 | 1.093 g |
| Vitamin K | 0.274 g |
| Non-Fat Dry Milk | 822.863 lb |
| Minerals | 60.687 lb |
| Magnesium Chloride | 20.930 lb |
| Sodium Chloride | 8.102 lb |
| Sodium Citrate | 15.698 lb |
| Potassium Citrate | 13.003 lb |
| Dipotassium Phosphate | 2.954 lb |
| Potassium Iodide | 0.8777 g |
| Premix of trace minerals and ultratrace minerals | 1469.338 g |
| Zinc Sulfate | 300.6266 g |
| Ferrous Sulfate | 289.4596 g |
| Manganese Sulfate | 79.5206 g |
| Copper Sulfate | 42.9047 g |
| Sodium Molybdate | 2.1673 g |
| Chromium Chloride | 2.1088 g |
| Sodium Selenite | 0.8208 g |
| Sucrose-diluent | 660.9082 g |
| Citric Acid | 90.6875 g |
| Vitamin Premix | 2714.34 g |
| Ascorbic acid | 1187.52 g |
| dl Alpha Tocopheryl Acetate | 203.58 g |
| Niacinamide | 111.97 g |
| d-Calcium Pantothenate | 64.47 g |
| Vitamin A Palmitate | 19.61 g |
| Pyridoxine Hydrochloride | 13.57 g |
| Thiamine Mononitrate | 10.21 g |
| Riboflavin | 10.18 g |
| Folic Acid | 3.393 g |
| Biotin | 2.171 g |
| Phylloquinone | 0.119 g |
| Vitamin D3 | 0.0382 g |
| Cyanocobalamin | 0.0339 g |
| *Flavoring Ingredients* | |
| Artificial Vanilla Flavor | 2714.34 g |
| Ethyl Vanillin | 271.25 g |
| Aspartame | 475.37 g |

TABLE II-continued
INGREDIENTS FOR 2,000 POUND BATCH OF VANILLA FLAVORED PRODUCT

| INGREDIENT | QUANTITY |
|---|---|
| Sucrose | 478.65 lb |
| Total Milk Protein Isolate | 221.37 lb |
| Fiber System | 224.37 lb |
| Oat hull fiber | 112.18 lb |
| Gum Arabic | 89.75 lb |
| Sodium carboxymethylcellulose | 22.44 lb |
| *Processing Aids* | |
| Hydrogen Peroxide | |
| Enzyme Lactase | |
| 45% Potassium Hydroxide | |
| Citric Acid | |

The first step in the process of manufacturing a weight control product according to the invention is to manufacture the base powder.

An oil blend is prepared by placing the high oleic safflower oil in a kettle and heating the oil to a temperature in the range of 140° to 150° F. while agitating the oil. The soy lecithin and monoglycerides are then added to the heated oil, and the blend is agitated well until the emulsifiers are dissolved. The Vitamin D3 and Vitamin K are added to the blend, and the blend is maintained at a temperature in the range of 140° to 150° F. under agitation until it is added to a nonfat milk slurry.

The main ingredient of the base powder is either non-fat dry milk or condensed skim milk (substituted at an equivalent quantity of total solids) which is hydrolyzed by enzyme lactase to reduce the lactose content to a level that is tolerable by lactose-intolerant individuals. The non-fat dry milk, or condensed skim milk, may be of either the "low-heat or "high-heat" type. Preferably the non-fat dry milk, or condensed skim milk, is of the "low-heat" type because it provides enhanced functional and organoleptic properties.

Prior to dissolving the non-fat dry milk, about 2,600 pounds of processing water is heated to be in the range of 80°–100° F., preferably 80° to 85° F. Hydrogen peroxide is added to the water, or to the milk, to inhibit microbial growth during the lactose hydrolysis of the milk. The usage level of hydrogen peroxide may vary from 30 to 70 parts per million (ppm) depending upon the desired length of the time for hydrolysis of the lactose in the non-fat milk. For a short hydrolysis time of about four hours a hydrogen peroxide concentration of 30–40 ppm is recommended. For a longer hydrolysis time, as in the preferred method, of about fourteen to eighteen hours, a hydrogen peroxide concentration of 50–70 ppm is recommended. The non-fat dry milk is dissolved in water using agitation to form a slurry at a concentration of about 35% to about 45%, most preferably about 39% total solids by weight. After the non-fat milk has been completely dissolved in the water, the pH of the slurry is adjusted to be in the range of 6.4–6.6, preferably 6.5. It is usually necessary to raise the pH of the slurry by adding a suitable amount of a potassium hydroxide solution to the slurry. However, if too much potassium hydroxide is used and the pH of the slurry needs to be lowered, a citric acid solution may be added to the slurry.

Enzyme lactase is then added to the non-fat milk slurry. The amount of enzyme lactase which is used depends upon the desired degree of lactose hydrolysis and the desired length of time for the lactose hydrolysis. For a short hydrolysis time of about four hours, an enzyme lactase usage level of about 4–5 g of enzyme per pound of milk solids and a hydrolysis temperature of about 90° to 100° F. is recommended. In a preferred embodiment using a hydrolysis time of about fourteen to eighteen hours, an enzyme lactase level of about 1.5–2.5 g per pound of milk solids and a hydrolysis temperature of 80° to 85° F. is preferred. The foregoing hydrolysis conditions result in a minimum of 70% lactose hydrolysis in the non-fat milk. The completion of the enzymatic hydrolysis is determined by ascertaining the level of residual lactose in the non-fat milk. The level of residual lactose can be determined by using chromatographic or enzymatic assay methods, for example the Boehringer Mannheim method for the determination of lactose and D-galactose in Foodstuffs, Catalog Number 176303 of Boehringer Mannheim, Indianapolis, Ind. U.S.A.

The oil blend is added to the non-fat milk slurry. The slurry is then heated to a temperature in the range of 145° to 150° F. to inactivate the enzyme lactase. The slurry is homogenized, preferably using a two-stage homogenizer at 3,000±100 psig at the first stage and 500±100 psig at the second stage, then pasteurized (165°–175° F. for 16 seconds) and then cooled to 38°–44° F. and held at this temperature under agitation.

The minerals are then dissolved with agitation in about 500 pounds of water at a temperature in the range of 140° to 150° F. in the following order: magnesium chloride, sodium chloride, sodium citrate, potassium citrate and dipotassium phosphate. The solution containing the minerals is then added to the slurry with rapid agitation.

The potassium iodide is then dissolved in about 100 pounds of water at a temperature in the range of 80° to 110° F. Next, the premix of trace minerals and ultratrace minerals is dissolved in the potassium iodide solution with agitation. The resultant solution is then added to the slurry with agitation. After ten minutes of agitation the pH of the slurry is checked. The pH of the slurry should be in the range of 6.40 to 6.90. If necessary the pH of the slurry is adjusted to be in the specified range using potassium hydroxide or citric acid as described above.

The slurry is then spray dried to produce the base powder.

The base powder is dry blended with the remaining ingredients. In a preferred embodiment about twenty pounds of the base powder is dry blended with the vitamin premix and the flavoring ingredients. (In the case of the chocolate flavored product, the Dutch Process Cocoa is not included in this step as a flavoring ingredient.) The product of this step is then added to the remainder of the base powder. The sucrose, total milk protein isolate, fiber system, and in the case of the chocolate flavored product the Dutch Process Cocoa, are then dry blended with the base powder. It is understood that the sucrose may be partially or completely replaced by a starch hydrolysate (e.g. corn syrup solids or maltodextrins) having a dextrose equivalent of 10–25, without departing from the scope of the present invention. While the components of the fiber system (oat hull fiber, gum arabic and sodium carboxymethylcellulose) have only been added to the dry blend individually thus far, it is believed that no adverse effects would be experienced if the components of the fiber system would first be dry blended together and then be dry blended with the base powder and other ingredients.

For ease of dispersibility upon reconstitution with water, the dry blended product is agglomerated. The preferred method of agglomeration is a fluidized bed agglomeration process in which the rewetted powder particles are suspended in air in such a way that the process promotes rapid and complete agglomeration in a very small space. In the preferred embodiment the agglomerated particles should be of a size having a loose bulk density in the range of 0.25–0.33 g/cc and a moisture content in the range of 3% to 5%.

The agglomerated powder is then packaged in nitrogen-flushed single serving pouches or any other suitable containers, preferably with an oxygen level below 2%.

The spray drying and agglomeration steps may be omitted if the weight control product will be packaged as a ready-to-serve or concentrated liquid.

The contents of a pouch containing an amount of the weight control product in a dry powder form for one serving (about 67 g for a vanilla flavored product and about 71 g for a chocolate flavored product) is reconstituted in about nine ounces of water. The nutritional information for one serving of the weight control product of the invention are listed in Table III.

TABLE III

NUTRITIONAL INFORMATION FOR ONE SERVING OF NEW PRODUCT

|  |  | Percent of U.S. RDA |
|---|---|---|
| Serving Size: | 67.0 g for Vanilla Flavored Product. | |
|  | 71.0 g for Chocolate Flavored Product. | |
| Calories | 240 | |
| Protein | 16 g | |
| Fat | 6 g | |
| Carbohydrate | 30 g | |
| Dietary Fiber | 7 g | |
| Sodium | 500 mg | |
| Potassium | 750 mg | |
| Vitamin A | 1750 IU | 35 |
| Vitamin C | 21 mg | 35 |
| Thiamine (Vitamin B1) | 0.53 mg | 35 |
| Riboflavin (Vitamin B2) | 0.60 mg | 35 |
| Niacin | 7.0 mg | 35 |
| Calcium | 350 mg | 35 |
| Iron | 6.3 mg | 35 |
| Vitamin D | 140 IU | 35 |
| Vitamin E | 10.5 IU | 35 |
| Vitamin B6 | 0.7 mg | 35 |
| Folic Acid | 140 mcg | 35 |
| Vitamin B12 | 2.1 mcg | 35 |
| Phosphorus | 350 mg | 35 |
| Iodine | 52.5 mcg | 35 |
| Magnesium | 140 mg | 35 |
| Zinc | 5.3 mg | 35 |
| Copper | 0.7 mg | 35 |
| Biotin | 105 mcg | 35 |
| Pantothenic acid | 3.5 mg | 35 |
| Chloride | 775 mg | 35 |
| Manganese* | 1.3 mg | — |
| Vitamin K* | 27 mcg | — |
| Selenium* | 24 mcg | — |
| Chromium* | 26 mcg | — |
| Molybdenum* | 50 mcg | — |

*No U.S. RDA has been established, but these levels do meet the recommendations of other organizations.

One serving of a weight control product according to the invention is formulated to serve as a complete meal replacement in a weight loss program. One serving provides at least one-third of the U.S. Recommended Daily Allowance (US RDA) for protein, minerals and vitamins, one-third of the recommended minimum daily intake for fiber, and about 240 calories. Most participants in a moderate weight loss program may use the weight control product of the invention as a daily replacement for two meals, or two meals and up to two snacks, depending upon the calorie recommendations for a particular participant.

Tables IV, V, VI, VII, and VIII present data comparing the weight control product of the present invention with other weight control products which are commercially available in a powdered form. The data for the commercially available products is taken from the packaging labels for these products. In Tables IV, V, VI, VII and VIII: Product A is the weight control product of the present invention; Product B is Ultra-Slim-Fast® which is distributed by Slim-Fast Foods, a division of Thompson Medical Co., Inc.; Product C is Dyna-Trim® which is marketed by the Lederle Laboratories Division of American Cyanamid Company; and Product D is OptiTrim® which is available from Clinical Products Division of Sandoz Nutrition Corp. Table IV shows the caloric profiles of the weight control product of the present invention and these commercially available products.

TABLE IV

| Product | Calories total kcal/Svg | Protein | % Calories Carbohydrate | Fat |
|---|---|---|---|---|
| A | 240 | 27 | 50.5 | 22.5 |
| B | 220 | 27 | 60 | 16 |
| C | 220 | 30 | 56 | 16 |
| D | 233 | 30 | 50 | 20 |

In each serving of the weight control product of the invention the percentage of calories contributed by protein, carbohydrate and fat are about 25% to 30%, about 45% to 55% and about 20% to 30%, respectfully, and most preferably 27%, 50.5% and 22.5%, respectively. Current recommendations of the American Heart Association are for carbohydrate to provide 50% to 55%, and fat no more than 30%, respectively, of total calories. The preferred embodiment of weight control product of the invention meets the American Heart Association recommendations for percentages of calories provided by carbohydrate and fat. The percentage of calories provided by protein is higher than that recommended in diets for weight maintenance. This is necessitated by the fact that for diets low in calories to meet the protein intakes recommended by National Academy of Sciences, National Research Council's Recommended Dietary Allowances (NAS-NRC RDA's) of 58 to 63 grams per day for men and 46 to 50 grams per day for women, the percentage of total calories provided by protein must be disproportionately high. However, when the weight loss formulation of the invention is consumed daily in conjunction with a meal and snack(s), the profile of a person's overall diet more closely approximates the recommended patterns, especially for person's on higher calorie levels. The weight control product of the present invention was developed with these recommendations in mind. The distribution of calories (i.e. percentages contributed by protein, carbohydrate and fat) in the weight control product of the present invention more closely approximate the recommendations than do those of the other products.

The Committee on Diet and Health, Food and Nutrition Board, Commission on Life Sciences, National Research Council recently issued dietary recommendations and summarized those of other expert groups (Diet and Health: Implications for Reducing Chronic Disease Risk, 1989). Among other guidelines, the committee recommended a reduction in total fat intake to 30% or less of total calories, a reduction in saturated fatty acid intake to less than 10% of total calories and a reduction in cholesterol intake to less than 300 mg per day. In its summary of recommendations of other expert groups, the committee noted the most consistent recommendation for the general population was to limit the intake of total fat to less than, but approximating, 30% of total calories. Other common suggestions were a reduction in saturated fatty acid intake, usually to less than 10% of total calories, and an intake of polyunsaturated fatty acids not to exceed 10% of total calories. The level and source of fat in the weight control product of the present invention meet these guidelines, whereas those in the other products do not. Milk fat and hydrogenated soybean oil are higher in saturated fatty acids than are recommended.

In the following tables, TABLE V presents a comparison of the protein content and sources of the product of the invention and the above-identified commercially available products; TABLE VI presents a comparison of the fat content and sources of the product of the invention and the above described commercially available products; and TABLE VII presents a comparison of the carbohydrate content and sources of the product of the invention and the above-described commercially available products.

TABLE V

| Product | Protein g/Svg | Source |
|---|---|---|
| A | 16 | Lactose-reduced non-fat milk; Milk protein isolate |
| B | 15 | Nonfat dry milk; Soy protein isolate; fluid milk; Whey powder; Whey protein concentrate |
| C | 17 | Whey protein concentrate; Calcium caseinate; Soy protein isolate; Fluid milk |
| D | 17.3 | Calcium caseinate; Whey protein concentrate |

TABLE VI

| Product | Fat g/Svg | Source |
|---|---|---|
| A | 6 | High-oleic safflower oil |
| B | 4 | Milk Fat |
| C | 4 | Milk Fat |
| D | 5.3 | Partially hydrogenated soybean oil |

TABLE VII

| Product | Carbohydrate g/Svg | Source |
|---|---|---|
| A | 30 | Non-fat milk; Sucrose* |
| B | 33 | Sucrose; Fructose; Milk |
| C | 31 | Sucrose; Fructose; Milk |
| D | 29 | Fructose Hydrolyzed cornstarch |

*It is understood that the sucrose may be partially or completely replaced by a starch hydrolysate (e.g. corn syrup solids or malto-dextrins) having a dextrose equivalent of 10-25, without departing from the scope of the present invention.

At least ⅓ of the U.S. RDA for protein, minerals and vitamins is met per serving in the weight control product of the present invention. Ultra Slim-Fast® and DynaTrim® rely on the protein, minerals and vitamins in fluid milk to meet the amounts required by patients. However, OptiTrim® provides levels of vitamins and minerals similar to those in the weight control product of the present invention without the use of fluid milk.

The U.S. Food and Drug Administration (FDA), the U.S. Department of Health and Human Services (DHHS) and the American Dietetic Association (ADA) recommend a range of daily fiber intake of 20 to 35 grams per day. An important feature of the weight control product of the invention is that it contains sufficient fiber to enable a user of the product to meet the recommended daily fiber intake while following a calorie restricted diet. Seven grams dietary fiber per serving are provided in the weight control product of the invention to assist persons using the weight loss product of the present invention in meeting the minimum recommended daily dietary fiber intake of 20 to 35 grams. It is often difficult to meet this recommendation on calorie-restricted diets. By providing 14 grams in 2 servings (70% of the minimum recommended intake), a person using the weight loss product of the present invention has a better chance of consuming the daily recommended amount of dietary fiber under the volume restrictions of a reduced calorie diet. The blend of dietary fibers in the weight control product of the present invention provides a ratio of soluble to insoluble dietary fiber of approximately 50/50.

Numerous types of dietary fibers are currently available. Basically, dietary fiber passes through the small intestine undigested by enzymes and is a kind of natural and necessary laxative. Dietary fiber is understood to be all of the components of a food that are not broken down by enzymes in the human digestive tract to produce small molecular compounds which are then absorbed into the bloodstream. These components are mostly celluloses, hemicelluloses, pectin, gums, mucilages, lignin and lignin material varying in different plants according to type and age. These fibers differ significantly in their chemical composition and physical structure and subsequently their physiological function. Those skilled in the art have attempted to identify fibers (or fiber systems) which will normalize bowel function, alter glucose absorption, lower serum cholesterol and/or serve as an indirect energy source for the colon.

The properties of dietary fibers (or dietary fiber systems) most often related to physiological function are solubility and fermentability. With regard to solubility, fiber can be divided into soluble and insoluble components based on its capacity to be solubilized in a buffer solution at a defined pH. Fiber sources differ in the amount of soluble and insoluble dietary fiber they contain. As used herein and in the claims "soluble" and "insoluble" dietary fiber is determined using American Association of Cereal Chemists (AACC) Method 32-07. As used herein and in the claims "total dietary fiber" or "dietary fiber" is understood to be the sum of the soluble and insoluble dietary fiber determined by AACC Method 32-07 and wherein by weight at least 70% of the fiber source comprises dietary fiber. As used herein and in the claims a "soluble" dietary fiber source is a fiber source in which at least 60% of the total dietary fiber is insoluble dietary fiber as determined by AACC Method 32-06, and an "insoluble" dietary fiber source is a fiber source in which at least 60% of the total dietary fiber is soluble dietary fiber as determined by AACC Method 32-07. Examples of soluble dietary fiber sources are gum arabic, sodium carboxymethylcellulose, guar gum, citrus pectin, low and high methoxy pectin, barley glucans and psyllium. Examples of insoluble dietary fiber sources are oat hull fiber, pea hull fiber, soy fiber, beet fiber, cellulose, and corn bran.

"Applications of Soluble Dietary Fiber", FOOD TECHNOLOGY, January 1987, pages 74–75, teaches that the use of gum arabic and low viscosity grades of carboxymethylcellulose will allow the introduction of soluble dietary fiber into a liquid food, but that: "It is virtually impossible to formulate a good tasting, high fiber drink using insoluble forms of fiber." The dietary fiber system of the present invention succeeds in overcoming this hurdle by providing a unique blend of soluble and insoluble fibers.

A second property of fiber is the capacity to be fermented by the anaerobic bacteria present in the human large bowel. Certain beneficial effects of fiber in the human diet may be mediated by short chain fatty acids (SCFAs) produced during anaerobic fermentation in the large bowel. Furthermore, it is clear that certain beneficial effects of increased fiber consumption may result from chemical and/or physical properties of the intact fiber (e.g. water holding capacity and absorption of bile acids). Fibers vary significantly in their fermentability. As used herein and in the claims the term "non-fermentable" is understood to refer to dietary fibers which have a relatively low fermentability of less than 40%, preferably less than 30%, and the term "fermentable" is understood to refer to dietary fibers which have a relatively high fermentability of greater than 60%, preferably greater than 70%. Examples of fermentable dietary fiber sources are gum arabic and guar gum. Examples of non-fermentable dietary fiber sources are carboxymethylcellulose (CMC), oat hull fiber and corn bran.

As used herein and in the claims fermentability is determined by the following method, which is also described in "Fermentability of various fiber sources by human fecal bacteria in vitro[1-3]" at AMERICAN JOURNAL OF CLINICAL NUTRITION, 1991; 53: 1418–1424. A healthy human donor serves as a source of fecal material from which an inoculum is prepared. For 8 days before the onset of the experiment, the fecal donor should consume more than 20 g of total dietary fiber per day. This level of consumption may be ensured by consumption of commercial products containing mixtures of soluble and insoluble fibers. An inoculum is prepared from fecal material by mixing 20 g of feces with 180 g of an anaerobic dilution solution and then by blending the mixture and filtering it through cheese cloth. The anaerobic dilution solution is prepared as presented below. The inoculum is prepared under carbon dioxide to maintain anaerobiosis.

| ANAEROBIC DILUTION SOLUTION[a] (1 Liter) | |
|---|---|
| INGREDIENT | AMOUNT |
| Mineral solution 1[b] | 37.5 mL |
| Mineral solution 2[c] | 37.5 mL |
| Resazurin solution (.1% w/v)[d] | 1.0 mL |
| NaHCO$_3$ | 6.37 g |
| Distilled H$_2$O (sonicated) | 924.0 mL |
| cysteine HCl•H$_2$O | 0.5 g |

[a]Mix minerals 1 and 2, resazurin and water, saturate with carbon dioxide, and add NaHCO$_3$ and autoclave. Add 0.5 g of cysteine HCl to cooled solution.
[b]K$_2$HPO$_4$, 0.6 g; Na Citrate•2H$_2$O, 0.2 g; d H$_2$O, 100 mL.
[c]NaCl, 1.2 g; (NH$_4$)SO$_4$, 1.2 g; KH$_2$PO$_4$, 0.6 g; CaCl$_2$, 0.12 g; MgSO$_4$•7H$_2$O, 0.25 g; Na Citrate•2H$_2$O, 2 g; d H$_2$O 100 mL; (dissolve salts in H$_2$O in above order).
[d]Resazurin, 0.05 g; d H$_2$O, 50 mL.

An in vitro medium composition is prepared as presented below. One day before the start of the fermentation, all ingredients except cysteine are mixed together, purged with carbon dioxide, autoclaved, capped, and refrigerated. Just before the fermentation, the medium is warmed to 37° C., purged with carbon dioxide, and cysteine added.

| IN VITRO MEDIUM COMPOSITION | |
|---|---|
| INGREDIENT | AMOUNT (%) |
| Volume:volume | |
| Salts A* | 33.0 |
| Salts B | 33.0 |
| Water | 30.61 |
| Vitamin mix | 2.0 |
| Minerals solution § | 1.0 |
| Hemin solution (0.5 g/L) | 0.25 |
| Resazurin solution (1 g/L) | 0.10 |
| SCFA mix ‖ | 0.04 |
| Weight:volume | |
| Yeast extract | 0.05 |
| Trypticase | 0.05 |
| $Na_2CO_3$ | 0.40 |
| Cysteine HCl•$H_2O$ | 0.05 |

*Composition (g/L): NaCl, 5.4; $KH_2PO_4$, 2.7; $CaCl_2$•$H_2O$, 0.16; $MgCl$•$6H_2O$, 0.12; $MnCl_2$•$4H_2O$, 0.06; $CoCl_2$•$6H_2O$, 0.06; $(NH_4)_2SO_4$, 5.4.
Composition: 2.7 g $K_2HPO_4$/L.
Composition (mg/L): thiamin-HCl, 100; pantothenic acid, 100; niacin, 100; pyridoxine, 100; riboflavin, 100; folic acid, 2.5; biotin, 2.5; para-aminobenzoic acid (PABA), 5; vitamin B-12, 0.25; phylloquinone, 50.
§ Composition (mg/L): ethylenadiaminetetraacetic acid (EDTA) disodium salt, 500; $FeSO_4$•$7H_2O$, 200; $ZnSO_4$•$7H_2O$, 10; $H_3PO_4$, 30; $CuCl_2$•$2H_2O$, 1; $NiCl_2$•$6H_2O$, 2; $Na_2MoO_4$•$2H_2O$, 3.
‖ Short-chain fatty acid composition (25% each): N-valeric acid, isovaleric acid, isobutyric acid, DL-2-methylbutyric acid.

The fermentation is conducted by adding 30 mL of the medium and 1 ml of the inoculum to 50-mL centrifuge tubes that are fitted with one-way gas-release valves and should contain 0.31 g of the fiber being evaluated. Additions to the tubes are made under a stream of carbon dioxide. The tubes should be incubated at 37° C.

Fermentation should be stopped after 24 hours by refrigerating the sample. After refrigeration, the sample is mixed with four volumes of 95% ethanol, allowed to precipitate for 1 hour, and then filtered through Dacron (pore size 20–70 μm). The Dacron and residue are dried at 57° C., the residue is scraped into a preweighed vial and, after drying at 57° C., the residue is weighed. It is understood that the residue comprises a mixture of microbial mass and non-fermentable dietary fiber and it is assumed for the purpose of the present invention that if the residue is by weight x% of the starting material, then the starting material comprised at least (100−x)% fermentable dietary fiber.

These properties of fiber solubility and fermentability are useful in identifying fibers for the treatment and/or prevention of certain conditions. For example, one purpose of the fiber in the weight loss product of the present invention is to normalize bowel function. As used herein the phrase "normalize bowel function" refers to the treatment and prevention of constipation or diarrhea.

TABLE VIII presents a comparison of the dietary fiber content and sources of the product of the invention and the above-identified commercially available products.

TABLE VIII

| | Fiber | |
|---|---|---|
| Product | g/Svg | Source |
| A | 7 | Oat hull fiber; Gum arabic; Sodium carboxymethylcellulose |
| B | 5 | Cellulose; Corn bran; Guar gum |
| C | 6 | Cellulose; Gum arabic; Carboxymethylcellulose; Pectin; Guar gum; Oat bran; Corn bran |
| D | 0 | NONE |

The dietary fiber system of the weight loss product of the present invention taken as a whole comprises by weight: 35% to 45%, most preferably about 40%, dietary fiber which is both soluble and fermentable; 5% to 15%, most preferably about 10%, dietary fiber which is both soluble and non-fermentable; and 45% to 55%, most preferably about 50%, dietary fiber which is both insoluble and non-fermentable. The dietary fiber system as a whole comprises by weight about 10 to 13% of the weight control product in a powdered form of the product. In the preferred embodiment the dietary fiber which is both soluble and fermentable is gum arabic, the dietary fiber which is both soluble and non-fermentable is sodium carboxymethylcellulose, and the dietary fiber which is both insoluble and non-fermentable is oat hull fiber. This dietary fiber system is the subject of U.S. patent application Ser. No. 07/722,437 filed on Jun. 27, 1991.

Gum arabic, also known as acacia, is an emulsifier, stabilizer and thickener. It is obtained from dried exudates of various acacia trees. Chemically, gum arabic is a heterogeneous polysaccharide with slightly acidic characteristics, mainly in the form of its potassium salt.

Sodium carboxymethylcellulose is a white, odorless, tasteless, nontoxic solid, for which the only solvent is water. It is understood that a sodium carboxymethylcellulose used in the practice of the present invention preferably has a viscosity in a 1% solution in water of not greater than 15 cps. Such a low viscosity CMC is available from TIC Gums, Inc. of Belkamp, Md. U.S.A.

The oat hull fiber used in the practice of the present invention is understood to comprise ground up oat hulls. Preferably in the practice of this invention the oat hulls have been subjected to a bleaching treatment in a reaction medium comprising an aqueous solution of strong alkali and hydrogen peroxide at a controlled pH in the range of about 11.2 to about 11.8 until substantially all of the polysaccharide in the substrate has been made available as a water soluble fraction, and recovering the water-insoluble polysaccharide fraction from the reaction medium. This method of treatment is taught in U.S. Pat. No. 4,806,475 which is incorporated herein for the purpose of teaching this method.

With respect to most vitamins and minerals, one serving of a weight control product according to the invention provides at least 35% of the US RDA. Exceptions are sodium, potassium, chloride, manganese, vitamin K, selenium, molybdenum and chromium, for which no U.S. RDAs exist at the time of filing an application for a patent for the weight loss product of the present invention in the U.S.A. However, these nutrients are provided at levels in compliance with recommendations of the National Academy of Sciences/National Research Council.

Many persons are unable to tolerate lactose, the major carbohydrate found in milk and dairy products.

Lactose intolerance is experienced as gastrointestinal discomfort, nausea, gas in the abdomen and intestines, abdominal cramping and distension, belching or flatulence, and/or watery stools-after ingestion of lactose-containing foods. An estimated 70% of the world's population has low levels of intestinal lactase, the enzyme necessary to digest lactose. Although there is no evidence that human intestinal lactase concentrations fall as a function of age alone, the prevalence of intestinal lactase deficiency does increase with age in susceptible populations. Many prior art weight control products which come in a powder form must be mixed with milk, and, therefore, are not desirable for lactose-intolerant individuals. A one cup serving of milk contains from 10 to 16 g of lactose. While many of the less sensitive lactose intolerant individuals can tolerate approximately 5 g per serving, greater amounts taken at one time are likely to cause discomfort. A lactase enzyme treated non-fat dry milk, or condensed skim milk, which is processed to have a very low lactose content is the primary source of protein in the weight control product. As used herein and in the claims "milk" is understood to refer to cow's milk. As used herein and in the claims milk is understood to have a low lactose content when at least 70% of the lactose of the milk has been hydrolyzed to glucose and galactose.

The weight control product of the invention is designed to be incorporated into a multidisciplinary program having a nutrition education component that uses the exchange system of the American Dietetic Association/American Diabetes Association (ADA/ADA) to teach nutrition and meal planning. The weight control product of the invention comprises two lean meat exchanges, one bread exchange and one fruit exchange in this system. This "match" of macronutrients in the weight loss formulation of the invention with the ADA/ADA exchange system imparts advantages for using the weight loss formulation of the invention in teaching this system.

While certain representative embodiments and details have been described for the purpose of illustrating the invention, it will be apparent to those skilled in the art that various changes and modifications may be made therein without departing from the spirit or scope of the invention.

What is claimed:

1. A weight control product comprising a powder which contains low lactose milk and a dietary fiber system wherein taken as a whole the fiber system by weight comprises 35% to 45% dietary fiber which is both soluble and fermentable, 5% to 15% dietary fiber which is both soluble and non-fermentable and 45% to 55% dietary fiber which is both insoluble and non-fermentable, said powder being reconstitutable in water.

2. A weight control product according to claim 1 wherein said dietary fiber system comprises by weight 10 to 13% of said product.

3. A weight control product according to claim 2 wherein the dietary fiber which is both soluble and fermentable is gum arabic, the dietary fiber which is both soluble and non-fermentable is sodium carboxymethylcellulose, and the dietary fiber which is both insoluble and non-fermentable is oat hull fiber.

4. A weight control product according to claim 3 wherein about 25% to 30% of the calories provided by the product are contributed by protein, about 45% to 55% of the calories provided by the product are contributed by carbohydrate, and about 20% to 30% of the calories provided by the product are contributed by fat.

5. A weight control product according to claim 4 wherein the source of the protein is lactase enzyme treated nonfat milk and a milk protein isolate; the source of the carbohydrate is selected from the group consisting of sucrose, glucose, galactose produced by the enzymatic hydrolysis of the lactose of the nonfat milk and residual lactose and a starch hydrolysate having a dextrose equivalent of 10–25; and the source of the fat is high oleic safflower oil.

6. A weight control product according to claim 5 wherein one serving of the product provides about 240 calories.

7. A weight control product according to claim 1 wherein the dietary fiber which is both soluble and fermentable is gum arabic, the dietary fiber which is both soluble and non-fermentable is sodium carboxymethylcellulose, and the dietary fiber which is both insoluble and non-fermentable is oat hull fiber.

8. A weight control product according to claim 7 wherein about 25% to 30% of the calories provided by the product are contributed by protein, about 45% to 55% of the calories provided by the product are contributed by carbohydrate, and about 20% to 30% of the calories provided by the product are contributed by fat.

9. A weight control product according to claim 8 wherein the source of the protein is lactase enzyme-treated nonfat milk and milk protein isolate; the source of the carbohydrate is selected from the group consisting of sucrose, glucose, galactose produced by the enzymatic hydrolysis of the lactose of the nonfat milk and residual lactose and a starch hydrolysate having a dextrose equivalent of 10–25; and the source of the fat is high oleic safflower oil.

10. A weight control product according to claim 9 wherein one serving of the product provides about 240 calories.

11. A liquid weight control product comprising low lactose milk and a fiber system wherein taken as a whole the fiber system by weight comprises 35% to 45% dietary fiber which is both soluble and fermentable, 5% to 15% dietary fiber which is both soluble and non-fermentable and 45% to 55% dietary fiber which is both insoluble and non-fermentable.

12. A liquid weight control product according to claim 11 wherein an eight ounce serving of the liquid weight control product contains about 7 grams of said dietary fiber system.

13. A liquid weight control product according to claim 12 wherein the dietary fiber which is both soluble and fermentable is gum arabic, the dietary fiber which is both soluble and non-fermentable is sodium carboxymethylcellulose, and the dietary fiber which is both insoluble and non-fermentable is oat hull fiber.

14. A liquid weight control product according to claim 13 wherein one eleven ounce serving of the product contains about 240 calories, about 25% to 30% of the calories being contributed by protein, about 45% to 55% of the calories being contributed by carbohydrate, and about 20% to 30% of the calories being contributed by fat.

15. A liquid weight control product according to claim 14 wherein the source of the protein is lactase enzyme treated nonfat milk and a milk protein isolate; the source of the carbohydrate is selected from the group consisting of sucrose, glucose, galactose produced by the enzymatic hydrolysis of the lactose of the nonfat milk and residual lactose and a starch hydrolysate having a dextrose equivalent of 10–25; and the source of the fat is high oleic safflower oil.

16. A liquid weight control product according to claim 15 wherein one eleven ounce serving of the product provides about 240 calories.

17. A liquid weight control product according to claim 11 wherein the dietary fiber which is both soluble and fermentable is gum arabic, the dietary fiber which is both soluble and non-fermentable is sodium carboxymethylcellulose, and the dietary fiber which is both insoluble and non-fermentable is oat hull fiber.

18. A liquid weight control product according to claim 17 wherein about 25% to 30% of the calories provided by the product are contributed by protein, about 45% to 55% of the calories provided by the product are contributed by carbohydrate, and about 20% to 30% of the calories provided by the product are contributed by fat.

19. A liquid weight control product according to claim 18 wherein the source of the protein is lactase enzyme treated nonfat milk and a milk protein isolate; the source of the carbohydrate is selected from the group consisting of sucrose, glucose, lactose produced by the enzymatic hydrolysis of the lactose of the nonfat milk and residual lactose and a starch hydrolysate having a dextrose equivalent of 10–25; and the source of the fat is high oleic safflower oil.

20. A liquid weight control product according to claim 19 wherein one eleven ounce serving of the product provides about 240 calories.

* * * * *

UNITED STATES PATENT AND TRADEMARK OFFICE
CERTIFICATE OF CORRECTION

PATENT NO. : 5,104,676

DATED : April 14, 1992

INVENTOR(S) : Mohamed I. Mahmoud, Lisa D. Craig, Keith A. Garleb, and Robert L. Joseph It is certified that error appears in the above-identified patent and that said Letters Patent is hereby corrected as shown below:

Column 2, line 9 "stirring" should be --stirred--.

Column 2, line 13, "tan" should be --than--.

Column 2, line 18 "...weight product" should be --... weight control product--

Signed and Sealed this

Thirteenth Day of July, 1993

Attest:

MICHAEL K. KIRK

Attesting Officer

Acting Commissioner of Patents and Trademarks